United States Patent
Achten et al.

(10) Patent No.: US 12,070,368 B2
(45) Date of Patent: Aug. 27, 2024

(54) 3D-PRINTED ORTHODONTIC SPLINT MADE OF CROSSLINKED POLYMERS

(71) Applicant: Stratasys, Inc., Eden Prairie, MN (US)

(72) Inventors: Dirk Achten, Leverkusen (DE); Roland Wagner, Leverkusen (DE); Christoph Tomczyk, Leverkusen (DE); Thomas Buesgen, Leverkusen (DE)

(73) Assignee: Stratasys Inc., Eden Prairie, MN (US)

( * ) Notice: Subject to any disclaimer, the term of this patent is extended or adjusted under 35 U.S.C. 154(b) by 502 days.

(21) Appl. No.: 17/274,208

(22) PCT Filed: Sep. 18, 2019

(86) PCT No.: PCT/EP2019/074959
§ 371 (c)(1),
(2) Date: Mar. 8, 2021

(87) PCT Pub. No.: WO2020/058311
PCT Pub. Date: Mar. 26, 2020

(65) Prior Publication Data
US 2021/0315668 A1  Oct. 14, 2021

(30) Foreign Application Priority Data
Sep. 20, 2018 (EP) .................................... 18195715

(51) Int. Cl.
*A61C 7/08* (2006.01)
*B33Y 70/00* (2020.01)
*B33Y 80/00* (2015.01)
*B33Y 10/00* (2015.01)

(52) U.S. Cl.
CPC ................ *A61C 7/08* (2013.01); *B33Y 70/00* (2014.12); *B33Y 80/00* (2014.12); *A61C 2201/00* (2013.01); *B33Y 10/00* (2014.12)

(58) Field of Classification Search
CPC ............ A61C 7/08; B33Y 70/00; B33Y 80/00
See application file for complete search history.

(56) References Cited

U.S. PATENT DOCUMENTS

| | | | |
|---|---|---|---|
| 5,975,893 A | 11/1999 | Chishti et al. | |
| 10,492,888 B2 * | 12/2019 | Chen | C08F 220/283 |
| 2009/0148813 A1 * | 6/2009 | Sun | A61K 6/891 |
| | | | 433/213 |
| 2013/0095446 A1 | 4/2013 | Andreiko et al. | |
| 2013/0122448 A1 | 5/2013 | Kitching | |
| 2016/0256240 A1 | 9/2016 | Shivapuja et al. | |
| 2017/0007386 A1 | 1/2017 | Mason et al. | |
| 2019/0163060 A1 * | 5/2019 | Skamser | G03F 7/0048 |
| 2019/0338067 A1 * | 11/2019 | Liska | C08G 18/4833 |
| 2019/0374309 A1 * | 12/2019 | Parkar | B33Y 50/02 |
| 2021/0017302 A1 * | 1/2021 | Cheng | C08F 220/56 |

FOREIGN PATENT DOCUMENTS

| | | |
|---|---|---|
| CN | 103505295 A | 1/2014 |
| CN | 107847297 A | 3/2018 |
| WO | 2018119026 A1 | 6/2018 |

OTHER PUBLICATIONS

International Search Report, PCT/EP2019/074959, date of mailing: Oct. 25, 2019, Authorized officer: Claudio Salvatore.

* cited by examiner

*Primary Examiner* — Ralph A Lewis

(74) *Attorney, Agent, or Firm* — Faegre Drinker Biddle & Reath LLP

(57) ABSTRACT

The present invention relates to an orthodontic splint made of a crosslinked polymer, wherein the crosslinked polymer has a glass transition temperature $T_g$, determined by means of dynamic-mechanical analysis at a frequency of 1/s DMA as peak tan δ, of ≥25° C. and ≤60° C., a modulus of elasticity, determined by means of dynamic-mechanical analysis as the storage modulus E' at a frequency of 1/s at 35° C., of ≥500 MPa and ≤4000 MPa, and a loss factor tan δ, determined by means of dynamic-mechanical analysis at a frequency of 1/s at 35° C., of ≥0.08. The invention further relates to a process for producing such splints.

17 Claims, 3 Drawing Sheets

3D-PRINTED ORTHODONTIC SPLINT MADE OF CROSSLINKED POLYMERS

CROSS-REFERENCE TO RELATED APPLICATION

This application is a national stage application under 35 U.S.C. § 371 of PCT/EP2019/074959, filed Sep. 18, 2019, which claims the benefit of European Application No. 18195715.0, filed Sep. 20, 2018, each of which is incorporated herein by reference.

FIELD

The present invention relates to an orthodontic aligner comprising a crosslinked polymer, said crosslinked polymer having a glass transition temperature $T_g$, determined by dynamic mechanical analysis at a frequency of 1/s as peak tan δ, of ≥25° C. and ≤60° C., an elasticity modulus, determined by dynamic mechanical analysis as storage modulus E' at a frequency of 1/s at 35° C., of ≥500 MPa and ≤4000 MPa and a loss factor tan δ, determined by dynamic mechanical analysis at a frequency of 1/s at 35° C., of ≥0.08. The invention further relates to a method for producing aligners of this kind.

BACKGROUND

Malpositioned teeth may be corrected not only for esthetic reasons but also for reasons of health. Correct teeth positioning may be important for painless, functional alignment between the upper and lower jaws, and, moreover, the occurrence of other dental diseases, such as periodontitis or caries, for example, may be promoted by misaligned teeth and associated, less favorable possibilities for teeth cleaning. For these reasons, from a very early stage, a wide variety of different devices have been used in order to bring the position of individual teeth or all of the teeth of a user's dentition into a natural and esthetic form. Starting with simple wooden spatulas for manual correction of individual teeth, via more or less complicated jaw wiring systems, and through to dental braces, numerous appliances have been utilized for moving the teeth, using mechanical pressure, from an original malposition to a "proper" target position. The outcome of treatment was a function of duration of usage and pressure exerted, with the latter being a product of the combination of the structural composition of the aids and the materials used.

Having become established in recent years for the treatment of rows of teeth with complex malpositionings, alongside bonded wire braces, are orthodontic splints, known as aligners, which are cast and may also be fabricated individually via 3D printing. In these methods, typically, "future" tooth positions on the planned treatment pathway are forecast via a computer-controlled process, and these target tooth configurations are produced by way of a 3D printing process. Production of the corrective aids then takes place, however, via a process in which special films are thermoformed over the printed 3D tooth model. In the majority of cases, then, the aligner itself is not produced directly by means of 3D printing. In the prior art, though, there are also various production methods for the direct generation of aligners by means of 3D printing.

For example, U.S. Pat. No. 2,016,025 6240 A1 describes the production of directly printed aligners by various 3D printing methods, where the material utilized is intended to exhibit a tensile elasticity. Materials properties said in this case to be desired are materials properties of the kind known from the literature on film-based aligners. Examples of materials which fulfil these properties in 3D-printed form are not stated.

US 2013 0095 446 A1 describes the production of aligners by a 3D printing method, and lists commercially available methods and an arbitrary list of commercial, 3D-printable, biocompatible materials which are suitable for the methods, and which might possibly be suitable for the production of aligners.

US 2013 0122 448 A1 describes the product of an aligner via the 3D printing of a negative shape, which is then filled out with a liquid material as a positive shape. The cured positive shape then serves as an aligner.

U.S. Pat. No. 5,975,893 describes the production of thermoformed, transparent aligners, where a scan is made of the bite and various corrective positions are computed. From these, positive models of the teeth to be corrected and of the bite are then printed by means of a 3D printer. A film is thermoformed around this printed model and is worked up as a transparent splint. The film comprises one or more high-modulus thermoplastics of high melting point.

In spite of the alternatives already existing within the prior art, there continues to be a need for suitable 3D-printable materials which are suitable for use as orthodontic aligners and which have a profile of properties that is precisely adapted to the ambient conditions of the application.

SUMMARY

It is an object of the present invention, therefore, to overcome at least partly at least one drawback of the prior art and to provide materials for additive manufacturing methods that enable high resolution in production, exhibit excellent biocompatibility, and have improved applications properties under the physical conditions in the oral environment. It is a further object of the invention to be able to provide these items cost-efficiently and in a manner which is respectful of resources.

The object is achieved in accordance with the invention by an aligner as claimed in claim 1 and a method as claimed in claim 10. Advantageous developments are specified in the dependent claims. They may be freely combined, unless the context clearly suggests otherwise.

A proposal is made for an orthodontic aligner, wherein the aligner comprises a crosslinked polymer or consists of such a polymer, said crosslinked polymer having a glass transition temperature $T_g$, determined by dynamic mechanical analysis at a frequency of 1/s DMA as peak tan δ, of ≥25° C. and ≤60° C., an elasticity modulus, determined by dynamic mechanical analysis as storage modulus E' at a frequency of 1/s at 35° C., of ≥500 MPa and ≤4000 MPa and a loss factor tan δ, determined by dynamic mechanical analysis at a frequency of 1/s at 35° C., of ≥0.08.

BRIEF DESCRIPTION OF THE DRAWINGS

Various features and characteristics of the inventions described in this specification may be better understood by reference to the accompanying figures, in which.

DETAILED DESCRIPTION

Figure 1:
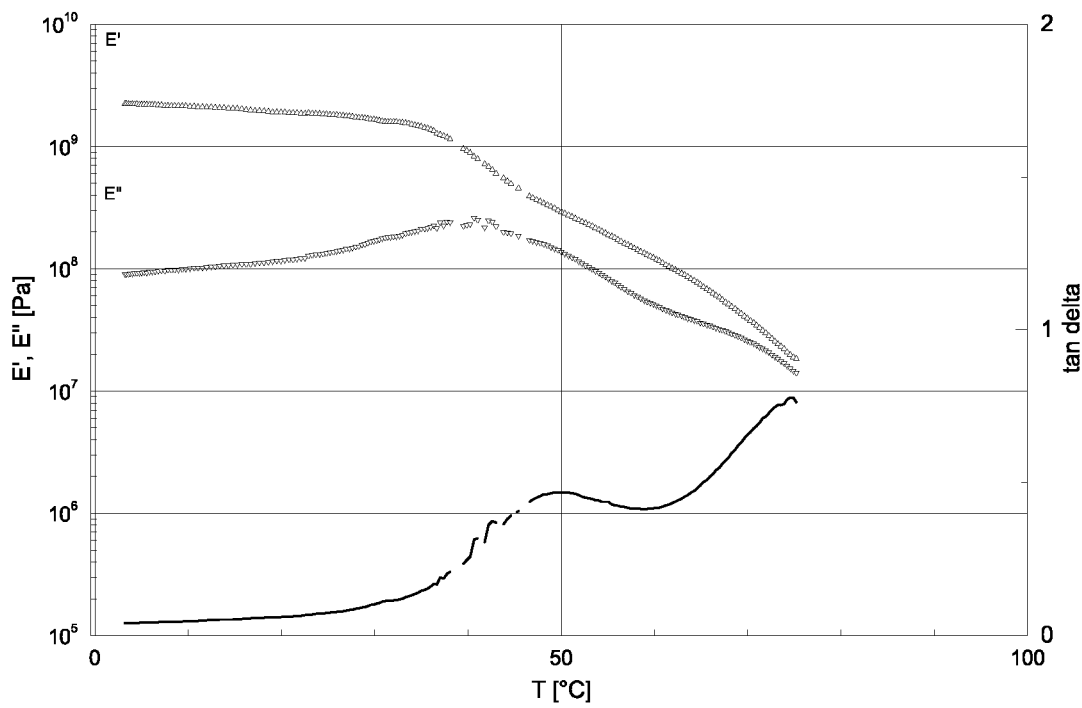
FIG. 1 shows DMA curves of a sample from the inventive experiment No. 1.

Surprisingly it has emerged that orthodontic aligners having parameters stated above show a significantly better treatment outcome than the aligners typically used. Without being tied to the theory, this may be because the aligner material employed shows a profile of properties attuned to the application temperature. This means that the polymers used have temperature-dependent properties, and the preferably crosslinked polymers claimed here apply the requisite mechanical properties at the treatment temperature within the oral cavity of a user.

This contrasts with the materials described in the prior art, whose suitability is adjudged substantially on the basis of the properties at room temperature. Typically, then, the suitability of a material is tested in a range between 20 and 25° C. and this material is classed either as suitable or as unsuitable, depending on the mechanical values obtained for it.

This approach, however, ignores the fact that the polymers employed frequently exhibit highly temperature-dependent properties, and that the temperatures during the application differ significantly from room temperature. Accordingly, the aligners claimed here exhibit a profile of properties which is much more adapted in terms of temperature.

Associated with this in particular is a greater toughness of the material at 35° C., allowing the aligners claimed here to apply much higher forces in the oral cavity over a longer time than the materials known from the prior art. For the latter it is found in particular that, at the relevant temperatures within the mouth compartment, much lower strengths and/or lower deformabilities are obtained.

At the application temperature, the material described and characterized above exhibits simultaneously a high modulus and a high toughness, with a reversible, plastic deformability. In addition to the temperature-adapted suitability, a further advantage is produced through the selection of polymers having the physical properties stated here.

Surprisingly it has been found that aligners made from a polymer having the above-specified glass transition temperature, the above-specified modulus at 35° C., and the above-specified loss factor at 35° C. have preferential application properties, which increase acceptance and increase wear comfort within the mouth region.

The material is tough and elastic enough to be able to be placed easily onto the teeth and removed again. The material is rigid enough to be able to exert a sufficient pressure on the teeth in order to alter the tooth position.

Furthermore, there is sufficient deformation of the material in the temperature range of the application, and so there is also a certain adaptation of the aligner to the current tooth position. This may lead, all in all, to more efficient treatment of malpositioned teeth.

A further advantage of the aligners of the invention, moreover, is that they are not thermoplastic and therefore are resistant to heat distortion even at temperatures of >60° C., meaning that they retain their shape at higher temperatures in the undeformed state.

Preferably, indeed, higher temperatures may be utilized to return aligners that have undergone slight deformation to their original state, because the polymers that are in accordance with the invention have a pronounced memory effect, based in shape terms on the printing geometry. This too is an indication that the mechanical properties of the aligners of the invention are more temperature-stable by comparison with the materials from the prior art. A further advantage is that the polymers used for producing the aligners of the invention are able to provide transparent orthodontic aligners.

An orthodontic aligner in the sense of the invention is a shaped fitment for one or more teeth or for an entire row of teeth, the aligner being suitable for the treatment of malpositioned teeth. To treat the malpositioned teeth, the aligner is mounted onto the teeth and worn for a certain treatment period. As a result of the physical architecture of the aligner, pressure is exerted at specific teeth contact points, and so the teeth are displaced from a starting position toward an altered end position. The order of magnitude of the change in position of the teeth is a function of the period of wear and of the pressure exerted. It has emerged more particularly that using the aligners employed in the invention, having the mechanical properties according to the invention, it is possible to exert a greater force for positioning of the teeth, allowing better treatment outcomes to be achieved within shorter times.

The aligner comprises a crosslinked polymer or consists of such a polymer. This means that the aligner either consists only of the crosslinked polymer, or that the aligner of the invention includes the crosslinked polymer. It is therefore possible for the aligner to comprise further substances as well as the polymer. For example, besides the actual polymer, it is also possible to use further auxiliaries, which are known to the skilled person for the formation of crosslinked polymer networks. These auxiliaries may be, for example, initiators for the crosslinking reaction, catalysts for the crosslinking, flexibilizers, dyes, fillers, plasticizers, or other structuring substances which provide the aligner with an adapted profile of properties. The aligner consists preferably to an extent of >50 wt %, more preferably >70 wt %, more preferably still >80, and very preferably >90 wt % of the crosslinked polymer. The weight percentage figures are based, unless otherwise indicated, always on the total weight of the aligner.

The glass transition temperature $T_g$ of the crosslinked polymer of the aligner is determined in tensile loading by dynamic mechanical analysis at a frequency of 1/s as peak tan α and amounts to ≥25° C. to ≤60° C., preferably ≥35° C. to ≤48° C. Surprisingly it has been found that crosslinked polymers of this kind are particularly suitable, after curing, for modeling the mechanical properties needed in the application of the aligner within the oral cavity.

The elasticity modulus of the crosslinked polymer of the aligner, determined in tensile loading by means of dynamic mechanical analysis as storage modulus E' at a frequency of 1/s at 35° C. is ≥500 MPa and ≤4000 MPa and preferably ≥1000 MPa and ≤2500 MPa. This range for the elasticity modulus of the aligner has proven particularly suitable for exerting a sufficient force on the teeth within short treatment durations. This range is therefore suitable for achieving a reliable treatment outcome relatively quickly.

The loss factor tan δ of the crosslinked polymer of the aligner, measured by means of dynamic mechanical analysis in tensile loading at 35° C., is ≥0.08. This range of magnitude for the loss factor of the material of the aligner may contribute overall to a suitable tough-elastic behavior on the part of the aligner. The tough-elastic behavior is an important parameter, which influences not only the application properties of the aligner but also the interactions of the aligner with the teeth. The loss factor may preferably be ≥0.1, preferably ≥0.12, more preferably ≤0.6, and more preferably ≤0.4.

It has surprisingly been found that it is easy to discover formulas for crosslinkable resins from which the crosslinked polymers of the aligner having the desired mechanical properties are obtained. This is done by provision of literature data on the glass transition temperatures of homopolymers of the corresponding pure monomers, and/or polymerizable constituents, especially (meth)acrylate monomers.

A formula is generated which comprises a plurality of monomers, especially (meth)acrylate monomers, and in which the weight fractions of the respective monomers are specified. The formula may usefully be generated in a computer-implemented way. A theoretical glass transition temperature for the formula is calculated, by multiplying the weight fractions of the respective monomers, expressed for example in weight % (based on the total weight of the polymerizable constituents), by the glass transition temperature assigned to the monomers, and summing the results.

Alternatively to the summing of the fractionally weighted glass transition temperatures of two monomers, it is possible to use the Fox equation, from which the glass transition temperature $T_g$ can be calculated as follows. The case shown is that of two different monomers:

$$1/T_g = w_1/T_{g,1} + w_2/T_{g,2}$$

where $w_1$ and $w_2$ are weight fractions of components 1 and 2, and $T_{g,1}$ and $T_{g,2}$ are glass transition temperatures of the homopolymers obtained from components 1 and 2, respectively.

It will be appreciated that further-refined models for predicting a glass transition temperature of a copolymer of more than two monomer constituents are likewise employable.

If this theoretical glass transition temperature is not located within the desired range, the fraction of at least one monomer is altered until a desired value is obtained. For instance, if the theoretical glass transition temperature is lower than a target value, then the fraction of a monomer having a higher glass transition temperature for the homopolymer than the present theoretical glass transition temperature can be increased. A lowering of the theoretical glass transition temperature can be achieved in the opposite way.

When the theoretical glass transition temperature of this initial formula has reached the desired range, a predetermined number of formulas is generated starting from this formula, as described above, these formulas having a theoretical glass transition temperature which is higher or lower by a predetermined amount than that of the initial formula. For example, 10 formulas may be generated, having a theoretical glass transition temperature in the range between 10° C. below and 30° C. above the theoretical glass transition temperature of the initial formula. When generating the formulas, it is useful to alter as few parameters as possible—for example, the relative fractions of two monomers having different glass transition temperatures for their homopolymers.

These formulas thus generated may then be produced in the laboratory, and the crosslinked polymers obtained from them may be tested in relation to their mechanical properties. A final formula may be obtained by interpolation or regression analysis, with the glass transition temperature as the variable to be achieved.

It has additionally emerged, surprisingly, that if the glass transition temperature of a polymer produced from a final formula obtained in this way lies within the specifications according to the invention, it is likely that the elasticity modulus at 35° C. and the loss factor tan δ at 35° C. likewise meet the specifications according to the invention. This considerably reduces, in practice, the trialing involved for a suitable formula.

In one embodiment of the aligner, the crosslinked polymer is a copolymer which comprises units based on a first monomer and a second monomer, said first monomer being a (meth)acrylic monomer whose homopolymer has a glass transition temperature, determined by dynamic mechanical analysis at a frequency of 1/s as peak tan δ, of ≤0° C., and said second monomer being a (meth)acrylic or styrenic monomer whose homopolymer has a glass transition temperature, determined by dynamic mechanical analysis at a frequency of 1/s as peak tan δ, of ≥60° C., and where units based on the first monomer are present in a fraction of ≥5 to ≤40 weight %, based on the total weight of the crosslinked polymer, and units based on the second monomer are present in a fraction of ≥20 to ≤80 weight %, based on the total weight of the crosslinked polymer. The stated weight % figures add up to ≥25% to ≤90 weight % of the polymerizable composition. The first monomer may be termed a "low $T_g$ monomer" and the second a "high $T_g$ monomer". Such monomers and the corresponding glass transition temperatures are known and available commercially. Examples of the first monomer are n-butyl acrylate and sec-butyl acrylate, tert-butyl acrylate, n-propyl acrylate, 2-propyl acrylate, 2-ethylhexyl acrylate, and ethyl acrylate. Examples of the second monomer are isobornyl acrylate (IBOA) and isobornyl methacrylate (IBOMA), methyl methacrylate, and, in one particular embodiment, styrene. It is of course also possible for the copolymer to be based on multiple different representatives of the "low $T_g$" monomers and/or of the "high $T_g$" monomers.

In a further embodiment of the aligner, the crosslinked polymer may comprise a crosslinked polyisocyanate or polyurethane.

According to a further embodiment, the crosslinked polymer is obtainable from the crosslinking of a resin comprising the following components, with the amounts in weight % being specified on the basis of the total weight of the resin, and adding up to ≥86 weight % to ≤100 weight %:

| | |
|---|---|
| urethane (meth)acrylate containing isocyanurate groups | 15-20 |
| alkanediol di(meth)acrylate | 1-5 |
| monofunctional (meth)acrylate whose resultant homopolymer has a glass transition temperature of ≤0° C. | 20-30 |
| monofunctional (meth)acrylate whose resultant homopolymer has a glass transition temperature of ≥60° C. | 50-60 | or the crosslinkable resin comprises the following components, with the amounts being specified in weight %, based on the total weight of the resin, and adding up to ≥90 weight % to ≤100 weight %:

| | |
|---|---|
| urethane (meth)acrylate containing uretdione groups | 10-15 |
| monofunctional methacrylate of a terpene alcohol | 5-10 |
| monofunctional (meth)acrylate whose resultant homopolymer has a glass transition temperature of ≤0° C. | 20-35 |
| monofunctional (meth)acrylate whose resultant homopolymer has a glass transition temperature of ≥60° C. | 55-60 |

The resins may further comprise additives such as photoinitiators, radical initiators, inhibitors, stabilizers, and the like.

Suitable urethane (meth)acrylates containing isocyanurate groups are obtainable, for example, by trimerizing aliphatic diisocyanates, more particularly pentamethylene diisocyanate, hexamethylene diisocyanate, and isophorone diisocyanate, or a mixture of at least two thereof, to form isocyanurates, and carrying out subsequent reaction with hydroxyalkyl (meth)acrylates such as hydroxyethyl methacrylate (HEMA) or hydroxypropyl acrylate to give the urethane.

Suitable urethane (meth)acrylates containing uretdione groups are obtainable, for example, by dimerizing aliphatic diisocyanates, more particularly pentamethylene diisocyanate, hexamethylene diisocyanate, and isophorone diisocyanate, or a mixture of at least two thereof, to give uretdiones and carrying out reaction with polyols (more particularly polyether polyols) to give NCO-terminated prepolymers. These prepolymers can then be reacted with hydroxyalkyl (meth)acrylates such as hydroxyethyl methacrylate (HEMA) or hydroxypropyl acrylate to give the urethane.

In another embodiment of the aligner, the crosslinked polymer may have an isocyanurate fraction, ascertained via $^{13}$C NMR, of ≥3%. The use of crosslinked polymers having a sufficient isocyanurate fraction in the above-specified range, in particular, may contribute to the preferred temperature-dependent properties of the aligner. This isocyanurate fraction may more particularly lead to the preferred strength, expressed by the storage modulus according to the invention. Further-preferred isocyanurate fractions may preferably be ≥5%, more preferably ≥8%, with further preference >10%. The % figures in this case are based on the weight fraction of the isocyanurate ring.

Moreover, in one preferred aspect of the aligner, the crosslinked polymer may have a urethane fraction, ascertained via $^{13}$C NMR, of ≥3%. The use of crosslinked polymers having a sufficient urethane fraction in the above-specified range, in particular, may contribute to the preferred temperature-dependent properties of the aligner. This urethane fraction may more particularly lead to the preferred strength and toughness-elasticity, expressed by the storage modulus according to the invention and the tan δ according to the invention. Further-preferred urethane fractions may preferably be ≥5%, more preferably ≥7%, with further preference >8%. The % figures in this case are based on the weight fraction of the urethane group.

In one preferred embodiment of the aligner, the crosslinked polymer has a refractive index, measured with an Abbe refractometer, of ≥1.48 RI and ≤1.58 RI. This range for the refractive index, in combination with low water swelling, preferably of <3 wt %, or preferably of <2 wt %, or preferably of <1 wt % or preferably of <0.5 wt %, and with good chemical resistance or stain resistance with respect to typical foods and beverages such as coffee, mustard and red wine, with a rating of preferably ≥3, preferably ≥4, and more preferably =5 (rating after application of the substance to the product surface, after exposure time of 10 min, on the basis of the discoloration of the product: rating with 5=uncolored and 0=highly colored, in analogy to paint resistance tests), may contribute to the aligner of the invention being virtually invisible under the physical and chemical conditions of the mouth compartment, i.e., in the temperature range of the mouth compartment and under the moisture conditions of the mouth compartment. Without being tied by the theory, this is a result preferably of the choice of the crosslinked polymer which, moreover, has the mechanical properties according to the invention. These ranges are suitable for making the wearing of the aligner less obtrusive, and it is possible consequently to boost the motivation of the user to wear the aligner. This may contribute to the desired treatment outcome being achieved more rapidly. In further embodiments, the refractive index may be ≥1.49 and ≤1.56, more preferably ≥1.495 and ≤1.54, and with further preference >1.5 and ≤1.53. The refractive index is measured at a temperature of 35° C.

Within a further characteristic of the aligner, the crosslinked polymer may have a mean network arc length according to Flory and Huggins of ≥300 g/mol and ≤5000 g/mol. These ranges for the network arc length of the crosslinked polymers have proven particularly suitable for obtaining sufficiently tough-elastic properties on the part of the aligner. Within this range, the aligner may have the requisite rigidity and, moreover, the toughness and elasticity needed in the application. This may contribute to preferred application properties, such as, for example, easy insertion of the aligner and rapid rotational positioning of the teeth. The mean network arc length may be determined by a swelling measurement in acetone. Where a network is swollen with a solvent, the penetration of the solvent leads to an increase in volume (attractive interaction between solvent and polymer matrix), and the Gibbs' mixing enthalpy ΔGm goes up. An entropy-driven restoring force ΔGel counteracts this process. When an equilibrium state is reached, the Gibbs' free energy ΔG becomes zero. ΔGm can be determined by means of the Flory-Huggins equation; ΔGm follows from the Gaussian network theory. With the condition ΔG=0 for the equilibrium state of the swelling, the Flory-Rehner equation follows:

$$M_C = \frac{\rho V_{m1}\left(\frac{\phi_2}{2} - \phi_2^{\frac{1}{3}}\right)}{\ln(1-\phi_2) + \phi_2 + \left(\chi \phi_2^2\right)}$$

With the density of the polymer and with the Huggins interaction parameter, the molecular weight of the mean network arc length, MC, may be determined on the basis of swelling experiments for determining the volume fraction of the polymer.

Alternatively, the mean network arc length Mc and also the crosslinking density v may be determined from the minimum in the rubber plateau of a DMA measurement at 1 Hz and 0.1% deflection above the Tg of the product.

$$Mc = \frac{E}{v} = \frac{3EEE}{E'_{EEE}}$$

$$v = \frac{E'_{EEE}}{3EE}$$

$$EE = EEEE\ EEE\ EEE\ EEEEEh\left[\frac{E}{E\ EE}\right]$$

$$E = EEEEEEE\ EE\ EhE\ EEEEE\ EE\left[\frac{EE}{E^3}\right]$$

$$E = E\ EEEE\ EEE\ EEEEEEEE\left[\frac{E}{EEE * E}\right]$$

$$E = EEEEEE\ EE\ EEE\ EEEEEE\ EE\ [E]$$

$$E' = EEEEEE\ EE\ EEEEEE[-]$$

$$v = \text{molar crosslinking density}\left[\frac{\text{mol}}{\text{cm}^3}\right]$$

The network arc length may preferably be ≥400 g/mol and ≤2000 g/mol, more preferably ≥500 g/mol and ≤1600 g/mol, with further preference >550 g/mol and ≤1400 g/mol, and >600 g/mol and ≤1200 g/mol.

As part of a further embodiment of the aligner, the polymer may be a transparent polymer having a light transmittance, measured in a UV-VIS spectrometer on a sample with a thickness of 1 mm in the wavelength range of 400-800 nm, of ≥50%. This transmittance may with particular preference be combined with a b* value in the L*a*b* in the CIELab color space of <50, preferably ≤30, preferably ≤20. The selection specifically of transparent materials which after manufacture are transparent and colorless may significantly increase the propensity of the user to wear the aligner, and may accordingly contribute to a better treatment outcome within a shorter time. The transmission in the above-specified wavelength range may preferably be ≥60%, preferably ≥70%, more preferably ≥80%, and likewise preferably ≥90%. The CIELab values may be determined using commercial devices.

Within a further embodiment of the aligner, the polymer may be a transparent polymer comprising polyurethanes and/or polysilicones, and may have an Abbe number of ≥20. In addition to the pure transmittance, for the crosslinked polymers, the Abbe number has also proven, surprisingly, to be an essential parameter for the user-related "visibility" of the aligner under wear conditions. Aligners having the Abbe numbers according to the invention are particularly unobtrusive and may thus contribute to an increased usage time by the user. The Abbe number for the above-specified aligner may preferably be ≥25, preferably ≥30, more preferably ≥35, and likewise preferably ≥38.

A further subject of the invention is a method for producing an orthodontic aligner, comprising the steps of: i) selecting a crosslinkable resin and ii) shaping the aligner by crosslinking the crosslinkable resin selected in step i), to form a crosslinked polymer, wherein the selection in step i) includes the criterion that a crosslinked polymer obtained after crosslinking of the crosslinkable resin has a glass transition temperature $T_g$, determined by dynamic mechanical analysis at a frequency of 1/s DMA as peak tan δ, of ≥25° C. and ≤60° C. (preferably ≥35° C. to ≤48° C.), an elasticity modulus, determined by dynamic mechanical analysis as storage modulus E at a frequency of 1/s at 35° C., of ≥500 MPa and ≤4000 MPa (preferably ≥1000 MPa and ≤2500 MPa), and a loss factor tan δ, determined by dynamic mechanical analysis at a frequency of 1/s at 35° C., of ≥0.08 (preferably ≥0.1, more preferably ≥0.12, more preferably still ≤0.6, and more preferably still ≤0.4).

In one embodiment of the method, the crosslinkable resin comprises a first monomer and a second monomer, said first monomer being a (meth)acrylic monomer whose homopolymer has a glass transition temperature, determined by dynamic mechanical analysis at a frequency of 1/s as peak tan δ, of ≤0° C., and said second monomer being a (meth) acrylic or styrenic monomer whose homopolymer has a glass transition temperature, determined by dynamic mechanical analysis at a frequency of 1/s as peak tan δ, of ≥60° C., and where the first monomer is present in a fraction of ≥5 to ≤40 weight %, based on the total weight of the resin, and the second monomer is present in a fraction of ≥20 to ≤80 weight %, based on the total weight of the resin. The stated weight % figures add up to ≤100 weight %. The first monomer may be termed a "low $T_g$ monomer" and the second a "high $T_g$ monomer". Such monomers and the corresponding glass transition temperatures are known and available commercially. Examples of the first monomer are n-butyl acrylate and sec-butyl acrylate. Examples of the second monomer are isobornyl acrylate (IBOA) and isobornyl methacrylate (IBOMA).

The crosslinkable resin selected in step i) preferably comprises the following components: where the amounts in weight % are reported on the basis of the total weight of the resin, and add up to ≥86 weight % to ≤100 weight %:

| | |
|---|---|
| urethane (meth)acrylate containing isocyanurate groups | 15-20 |
| alkanediol di(meth)acrylate | 1-5 |
| monofunctional (meth)acrylate whose resultant homopolymer has a glass transition temperature of ≤0° C. | 20-30 |
| monofunctional (meth)acrylate whose resultant homopolymer has a glass transition temperature of ≥60° C. | 50-60 | or the crosslinkable resin selected in step i) comprises the following components, with the amounts being specified in weight %, based on the total weight of the resin, and adding up to ≥90 weight % to ≤100 weight %:

| | |
|---|---|
| urethane (meth)acrylate containing uretdione groups | 10-15 |
| monofunctional methacrylate of a terpene alcohol | 5-10 |
| monofunctional (meth)acrylate whose resultant homopolymer has a glass transition temperature of ≤0° C. | 20-35 |
| monofunctional (meth)acrylate whose resultant homopolymer has a glass transition temperature of ≥60° C. | 55-60 |

Details of the crosslinkable resins and preferred compositions have already been set out earlier on in the text in connection with the aligner. They are equally valid for the crosslinkable resins in the method of the invention, and in order to avoid repetition are not reproduced again.

According to one embodiment, the aligner is shaped in step ii) by crosslinking the crosslinkable resin in a casting mold corresponding to the aligner.

According to another embodiment, the aligner is shaped in step ii) by means of an additive manufacturing method. Examples of suitable additive manufacturing methods ("3D printing") are DLP (Dynamic Light Processing), CLIP (Continuous Liquid Interface Production), inkjet methods, or SLA (laser-based stereolithography).

The method of the invention may be, for example, a method for producing an orthodontic aligner by means of a 3D printing method, in which a polymer containing actinically polymerizable double bonds is printed out in the form of an orthodontic aligner and polymerized.

The prior art provides no indicators relating to the development of suitable liquid, actinically curable materials (resin formulations) for use in 3D printing methods for producing orthodontic aligners based on highly crosslinked polymers. Published data discuss properties of materials always only in relation to the properties at room temperature, disregarding the service properties at elevated temperature.

The crosslinkable resins useful in the invention may preferably be processed at a typical viscosity of ≤10 000 mPas, preferably ≤5000 mPas, more preferably ≤1000 mPas at a processing temperature of ≥5° C. and ≤150° C., preferably ≥15 and ≤120° C., more preferably ≥20 and ≤110° C., and especially preferably ≥30 and ≤100° C. in the 3D printer.

A method of the invention for producing an object from a precursor may comprise the following steps:
I) depositing a radically crosslinked polymer on a carrier to obtain a ply of a build material joined to the carrier which corresponds to a first selected cross section of the precursor;

II) depositing a radically crosslinked polymer atop a previously applied ply of the build material to obtain a further ply of the build material which corresponds to a further selected cross section of the precursor and which is joined to the previously applied ply;

III) repeating step II) until the precursor is formed;

wherein the depositing of a radically crosslinked polymer at least in step II) is effected by introducing energy to a selected region of a radically crosslinkable resin corresponding to the respectively selected cross section of the object, and wherein the radically crosslinkable polymer has a viscosity (at processing temperature, DIN EN ISO 2884-1) of ≥5 mPas to ≤100 000 mPas.

The radically crosslinkable resin may in one variant comprise a curable component comprising NCO groups blocked with a blocking agent, compounds having at least two Zerewitinoff-active H atoms, and olefinic C=C double bonds, where the blocking agent is an isocyanate or the blocking agent is selected such that deblocking of the NCO group is not followed by liberation of the blocking agent as a free molecule.

After step III) it is also possible for step IV) to be carried out:

IV) treating the precursor obtained after step III) under conditions sufficient for at least partially deblocking NCO groups present in the radically crosslinked polymer of the precursor obtained and reacting the thus obtained functional groups with compounds having at least two Zerewitinoff-active H atoms to obtain the object.

In this method, the object may be obtained in two production phases. The first production phase can be regarded as the build phase. This build phase may be realized by means of ray-optic additive manufacturing processes such as stereolithography or the DLP (digital light processing) process or else by inkjet printing processes combined with radiative crosslinking, and is the subject of steps I), II), and III). The second production phase can be regarded as the curing phase and is the subject of step IV). The precursor or intermediate object obtained after the build phase is converted here to a more mechanically durable object without any further change in the shape thereof. The material from which the precursor is obtained in the additive manufacturing process may also be referred to as "build material".

The blocking agent may be selected from the group consisting of organic isocyanates, lactams, glycerol carbonate, a compound of the general formula (I):

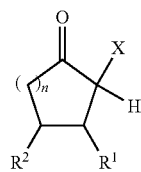

(I)

in which X is an electron-withdrawing group, $R^1$ and $R^2$ are independently the radicals H, $C_1$-$C_{20}$-(cyclo)alkyl, $C_6$-$C_{24}$-aryl, $C_1$-$C_{20}$-(cyclo)alkyl ester or amide, $C_6$-$C_{24}$-aryl ester or amide, mixed aliphatic/aromatic radicals having 1 to 24 carbon atoms which may also be part of a 4- to 8-membered ring, and n is an integer from 0 to 5, or a combination of at least two thereof.

Preferred compounds of general formula (I) are cyclopentanone 2-carboxymethyl ester and -carboxyethyl ester, cyclopentanone 2-carbonitrile, cyclohexanone 2-carboxymethyl ester and -carboxyethyl ester or cyclopentanone 2-carbonylmethyl. Particular preference is given to cyclopentanone 2-carboxymethyl ester and -carboxyethylester and cyclohexanone 2-carboxymethyl ester and -carboxyethyl ester. The cyclopentanone systems are easily obtainable industrially by a Dieckmann condensation of dimethyl adipate or diethyl adipate. Cyclohexanone 2-carboxymethyl ester may be produced by hydrogenation of methyl salicylate.

In a further variant of this method, the compounds, having at least two Zerewitinoff-active H atoms, in the curable component are selected from the group consisting of polyamines, polyols or a combination thereof. These may be for example low molecular weight diols (for example 1,2-ethanediol, 1,3- or 1,2-propanediol, 1,4-butanediol), triols (for example glycerol, trimethylolpropane) and tetraols (for example pentaerythritol), short-chain polyamines, but also higher molecular weight polyhydroxyl compounds such as polyether polyols, polyester polyols, polycarbonate polyols, polysiloxane polyols, polyamines and polyether polyamines and polybutadiene polyols.

The curable compound is preferably a compound obtainable from the dimerization of a diisocyanate to afford an NCO-terminated uretdione followed by reaction of the NCO groups with a hydroxyalkyl (meth)acrylate.

In a further variant of this method, in step IV) the treating of the precursor obtained after step III) under conditions sufficient for at least partially deblocking NCO groups present in the radically crosslinked polymer of the precursor obtained and reacting the thus obtained functional groups with compounds having at least two Zerewitinoff-active H atoms comprises a heating of the body to a temperature of ≥60° C. This temperature is preferably ≥80° C. to ≤250° C., more preferably ≥90° C. to ≤190° C. The chosen temperature or the chosen temperature range in step IV) may be maintained for example for ≥5 minutes to ≤48 hours, preferably ≥15 minutes to ≤24 hours and more preferably ≥1 hour to ≤12 hours.

Alternatively, the following step IV) may also be carried out after step III):

IV) treating the precursor obtained after step III) under conditions sufficient to carry out at least partial trimerization, forming isocyanurate groups, of NCO groups that are present in the radically crosslinked polymer of the precursor obtained, so that the object is obtained.

The treating in step IV) may in the simplest case be storage at room temperature (20° C.). Storage at a temperature above room temperature is also possible. During step IV), the NCO groups react with one another, resulting in further crosslinking of the already radically crosslinked material. This reaction results to some degree at least in trimerization to form isocyanurate groups. The present invention also encompasses the possibility that uretdione, allophanate, urea, urethane, biuret, iminooxadiazinedione, and/or oxadiazinetrione groups may also be formed from the NCO groups. Such side reactions may be specifically employed, for example to influence the glass transition temperature $T_g$ of the material obtained.

A further method for producing the aligner from a build material, where the build material comprises radically crosslinkable groups, NCO groups, and groups having Zerewitinoff-active H atoms, and the object is a three-dimensional article and/or a layer, has the feature whereby during and/or after production of the object, the build material is heated to a temperature of ≥50° C., and that the build material comprises one or more of the following cyclic tin compounds:

4,12-di-n-butyl-1,7,9,15-tetraoxa-4,12-diaza-8-stannaspiro[7.7]pentadecane, 4,12-di-n-butyl-2,6,10,14-tetramethyl-1,7,9,15-tetraoxa-4,12-diaza-8-stannaspiro[7.7]pentadecane, 2,4,6,10,12,14-hexamethyl-1,7,9,15-tetraoxa-4,12-diaza-8-stannaspiro[7.7]pentadecane, 4,12-di-n-octyl-2,6,10,14-tetramethyl-1,7,9,15-tetraoxa-4,12-diaza-8-stannaspiro[7.7]pentadecane, 4,12-di-n-octyl-1,7,9,15-tetraoxa-4,12-diaza-8-stannaspiro[7.7]pentadecane, 4,12-Dimethyl-1,7,9,15-tetraoxa-4,12-diaza-8-stannaspiro[7.7]pentadecan, 1,1-dichloro-5-methyl-5-aza-2,8-dioxa-1-stannacyclooctane, 1,1-diisopropyl-5-methyl-5-aza-2,8-dioxa-1-stannacyclooctane, 1,1-dibenzoyl-3,3,7,7-tetramethyl 5-n-octyl-5-aza-2,8-dioxa-1-stannacyclooctane, 1,1-dibenzoyl-5-n-octyl-5-aza-2,8-dioxa-1-stannacyclooctane, 1,1-bis(p-dodecylphenylsulfonyl)-5-n-octyl-5-aza-2,8-dioxa-1-stannacyclooctane, 2-benzoyloxy-6-octyl-4,8-dioxo-1,3,6,2-dioxazastannocan-2-yl benzoate or mixtures thereof.

These tin compounds are thermally labile. Below a certain temperature, they do not exhibit industrially useful catalytic activity for the reaction of NCO groups with functional groups bearing Zerewitinoff-active H atoms. The reactions in question here are especially urethanizations and urea formations. However, the catalytic activity increases markedly above a certain temperature. Without being bound to a particular theory, it is thought that the ligands then dissociate from the Sn center completely or partially, thus making the Sn center available as a catalyst. The catalysts may therefore be referred to as thermally latent catalysts. Because the NCO groups present in the build material do not react below this temperature, it is also possible to easily reuse the build material. According to the invention, activation of the Sn catalyst is achieved by heating to a temperature of ≥50° C., preferably ≥65° C., more preferably ≥80° C., particularly preferably ≥80° C. to ≤200° C., so that once reaction of the NCO groups has taken place the article is obtained. The heating may take place for a period of ≥1 minute, preferably ≥5 minutes, more preferably ≥10 minutes to ≤24 hours, preferably ≤8 hours, especially preferably ≤4 hours.

In one preferred embodiment of the method, the polymer has free isocyanate groups, measured by $^{13}C$ NMR, in a concentration ≥1 wt %, based on the polymer. The concentration of free isocyanate groups may, in particular, be beneficial to the mechanical properties of the fully reacted material of the aligner, and may contribute to improved elasticity of the aligner under application conditions. In one preferred embodiment, the polymer may contain free isocyanate groups in a concentration ≥1.5, preferably ≥2.0, more preferably ≥2.5, and with further preference ≥3.0 wt %.

Within another preferred embodiment of the method, the polymer has uretdione groups, measured by $^{13}C$ NMR, in a concentration ≥1 wt %, based on the polymer. The concentration of uretdione groups may, in particular, be beneficial to the mechanical properties of the fully reacted material of the aligner, and may contribute to improved elasticity of the aligner under application conditions. In one preferred embodiment, the polymer may contain uretdione groups in a concentration ≥1.5, preferably ≥2.0, more preferably ≥2.5, and with further preference ≥3.0 wt %.

In one preferred embodiment of the method, the polymer has free alcohol groups, measured by $^{13}C$ NMR, in a concentration ≥0.5 wt %, based on the total mass of the polymer. The concentration of free alcohol groups in the polymer may, in particular, be beneficial to the mechanical properties of the fully reacted material of the aligner, and may contribute to improved elasticity of the aligner under application conditions. In one preferred embodiment, the polymer contains free alcohol groups in a concentration ≥1.0 wt %, preferably ≥1.5 wt %, or preferably ≥2.0 wt % or preferably ≥2.5 wt %, based on the total mass of the resin.

In a further aspect of the method, the polymer, during and/or after the printing process, may be crosslinked by at least one further, nonradical crosslinking, with the network arc length in this case reducing by at least 20%, the $T_g$ rising by at least 3° C., the modulus rising by at least 15%, and the fracture resistance rising by at least 10%, based on the properties of the polymer before the printing process. For the production of the aligners of the invention, it has proven particularly favorable for the mechanical strength of the aligner to be obtained over a two-stage process. This has the capacity to decouple the degrees of freedom in the 3D printing process from the mechanical properties of the fully reacted aligner, making the mechanical properties of the aligner according to the invention more readily obtainable at application temperature. The curing of the polymer of the invention to form the product may preferably take place within a 2-stage process, in which first a green compact is generated in the 3D printer, and is subsequently removed, cleaned to remove unreacted polymer, and subjected in a second step to a radiative and/or thermal aftercure. In one preferred embodiment, the green compact for curing in this case is heated for a period of ≥1 min to ≤72 h, preferably ≥5 min to ≤24 h, or preferably ≥10 min to ≤12 h, to a temperature of ≥50° C. to ≤250° C., preferably ≥80° C. ≤200° C., or preferably ≥100° C.≤180° C.

Over the 2-stage process, the network arc length is reduced preferably by 25%, or preferably by 30% or preferably by 40%, based on the network arc length of the polymer before the printing process.

Over the 2-stage process, the glass transition temperature, $T_g$, rises preferably by 5° C., or preferably by 7° C., or preferably by 8° C., or preferably by 9° C., based on the $T_g$ of the polymer before the printing process.

Over the 2-stage process, preferably, the modulus rises preferably by 20%, or preferably by 30%, or preferably by 50%, or preferably by 100%, based on the modulus of the polymer before the printing process.

Over the 2-stage process, the fracture resistance may rise preferably by ≥15%, or preferably by ≥20%, by ≥25%, and more preferably by ≥30%, based on the fracture resistance of the polymer before the printing process.

EXAMPLES

The present invention is more particularly elucidated hereinbelow with reference to the subsequent examples without, however, being limited thereto. Experiments according to the invention in tables 1 and 2 are marked with an asterisk (*).

DMA measurements were carried out in accordance with the DIN EN ISO 6721 standard. A specimen of known geometry was subjected to mechanical nonresonant vibration in tension at a constant frequency of 1 Hz and a temperature of 0° C. to 80° C. in a Mettler Toledo DMA 861 instrument. As described in the standard, using the force and deformation measurements and the phase shift between force and deformation signal, the tensile storage modulus (E') and tensile loss modulus (E") were calculated. The test setup corresponded to Part 4 of ISO 6721.

Example 1: Production of Urethane Acrylate 1 from Desmodur® N3600 and Hydroxypropyl Acrylate In a glass flask, 100 g of the trifunctional isocyanate crosslinker Desmodur® N3600 (HDI trimer; obtained from Covestro Deutschland AG, Germany) were initially charged at room temperature. Added first to the isocyanate was 0.040 g of dibutyltin laurate, after which hydroxypropyl acrylate obtained from Sigma-Aldrich, Germany was added in an equimolar proportion, the addition taking place dropwise over a period of around 30 minutes. The reaction mixture was then heated to 60° C. using a temperature-controlled oil bath until the theoretical residual NCO content of 0% was achieved. To this end, samples were withdrawn from the reaction vessel at regular intervals and subjected to titrimetric determination according to DIN EN ISO 11909.

After attainment of the theoretical residual NCO content, 0.20 g of the inhibitor butyl hydroxytoluene was added, and the mixture was homogenized for 15 minutes. After cooling to 50° C., the reaction mixture obtained was then diluted to 80% using hexamethylenediol diacrylate (HDDA).

Example 2: Production of Urethane Acrylate 2, a Prepolymer with Blocked Isocyanates and Acrylate Functions In a glass flask, 130.0 g of the linear polypropylene ether polyol Desmophen® 1111BD (obtained from Covestro Deutschland AG, Germany) were initially charged at room temperature. Added first to the polyol was 0.043 g of dibutyltin laurate, after which 101.9 g of the hexamethylene diisocyanate-based uretdione Desmodur® N3400 (obtained from Covestro Deutschland, AG, Germany) were added dropwise over a period of around 30 minutes. The reaction mixture was then heated to 80° C. using a temperature-controlled oil bath until the theoretical residual NCO content of 4.71% was achieved. To this end, samples were withdrawn from the reaction vessel at regular intervals and subjected to titrimetric determination according to DIN EN ISO 11909.

After attainment of the theoretical residual NCO content, 0.20 g of the inhibitor butyl hydroxytoluene was added, and the mixture was homogenized for 15 minutes. After cooling to 50° C. had taken place, 33.8 g of hydroxyethyl methacrylate were then added dropwise and the mixture continued to be stirred until the residual NCO content had reached 0%. The reaction mixture obtained was diluted to 65% with isobornyl methacrylate (IBOMA).

Example 3: Production of the Radically Crosslinkable Resin

In a plastic beaker with lid, the urethane acrylate, the photoinitiator, and optionally inhibitor were weighed out in accordance with weight fractions from tables 1 and 2. These input materials were mixed in a Thinky ARE250 planetary mixer at 2000 revolutions per minute at room temperature for about 2 minutes. Then the quantities of n-butyl acrylate and/or isobornyl acrylate (IBOA) indicated in tables 1 and 2 were added, following by manual mixing with a spatula.

Where appropriate, in a further step, butanediol was heated to 40° C. and added, with manual mixing with a spatula.

Example 4: Curing of the Radically Crosslinkable Resin

The radically crosslinkable resin was applied to a glass sheet, using coaters with different slot sizes, one above another. This simulated a 3D printing process in the sense of a DLP 3D printer. The glass sheet had previously been treated with a 1% solution of soy lecithin in ethyl acetate and dried. The soy lecithin acted as a release agent to allow the cured films to be detached from the substrate again later. The slot sizes were 300 µm, 200 µm, and 100 µm.

The respective layers applied were each cured in a Superfici UV curing unit with mercury and gallium radiation sources at a belt speed of 5 m/min. The lamp output and belt speed resulted in a radiation intensity of 1300 mJ/cm$^2$ acting on the coated substrates. This produced a three-layer system with a total thickness of around 600 µm. The samples were conditioned, after curing, in a forced-air oven at 60° C. for 12 hours.

The cured films were carefully removed from the glass substrates, to give specimens for the mechanical characterization. In addition, tactile and optical assessments were made of the cured films.

TABLE 1

Formulas of UV-curable resin mixtures with urethane acrylate 1 (containing isocyanurate). The quantities are reported in parts by weight.

| Experiment No. | 1a | 1b | 1c | 1d | 1e* | 1* | 2 | 3 | 4 | 5 | 6 | 7 | 8 |
|---|---|---|---|---|---|---|---|---|---|---|---|---|---|
| Urethane acrylate 1 (including HDDA) | 20 | 21 | 21 | 20 | 20 | 21 | 20 | 20 | 20 | 20 | 20 | 20 | 21 |
| IBOA | 80 | 75 | 70 | 65 | 60 | 55 | 50 | 45 | 40 | 35 | 30 | 25 | 20 |
| n-butyl acrylate | 0 | 5 | 10 | 15 | 20 | 25 | 30 | 35 | 40 | 45 | 50 | 55 | 60 |
| photoinitiator | 5 | 5 | 5 | 5 | 5 | 5 | 5 | 5 | 5 | 5 | 5 | 5 | 5 |
| tactility at 35° C. | hard, brittle | hard, brittle | hard, light brittle | hard | hard, tough | hard, tough | tough | tough | soft | soft | tacky to touch | tacky to touch | tacky to touch |
| $T_g$ (tan δ)/DMA [° C.] | | 78 | 69 | | | 47 | | | | | | | |
| E' 35° C./DMA [MPa] | | 2095 | 2023 | | | 1456 | | | | | | | |
| tan δ 35° C./DMA | | 0.037 | 0.040 | | | 0.254 | | | | | | | |

Figure 2:
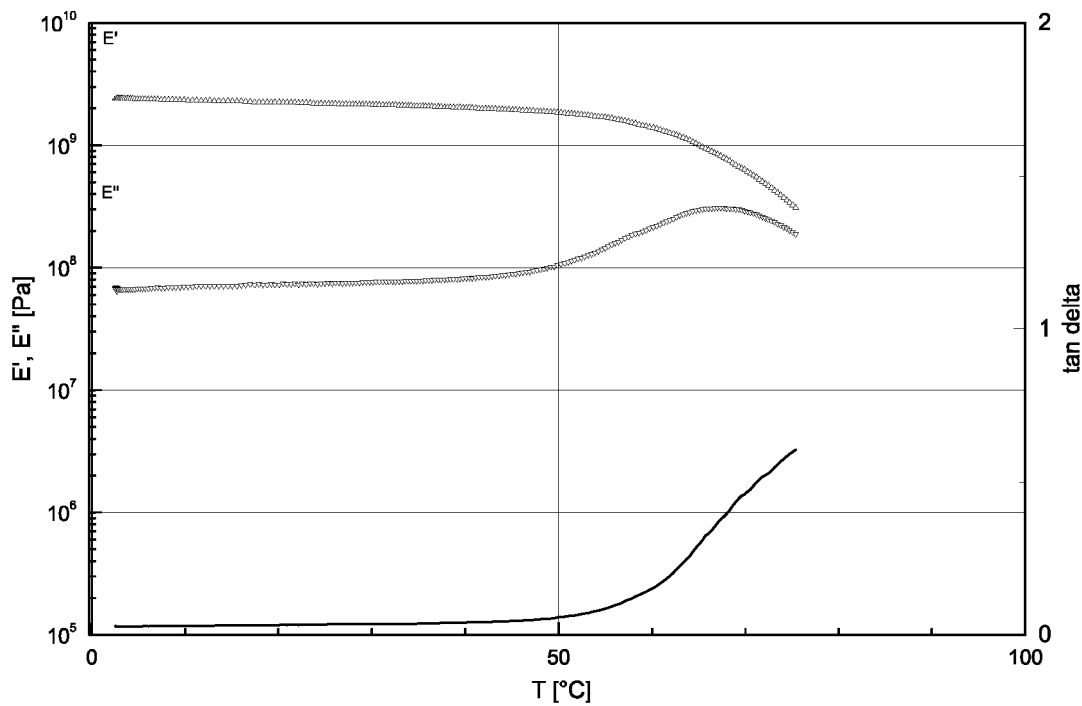
FIG. 2 shows DMA curves from experiment No. 1b (comparative example)
Figure 3:
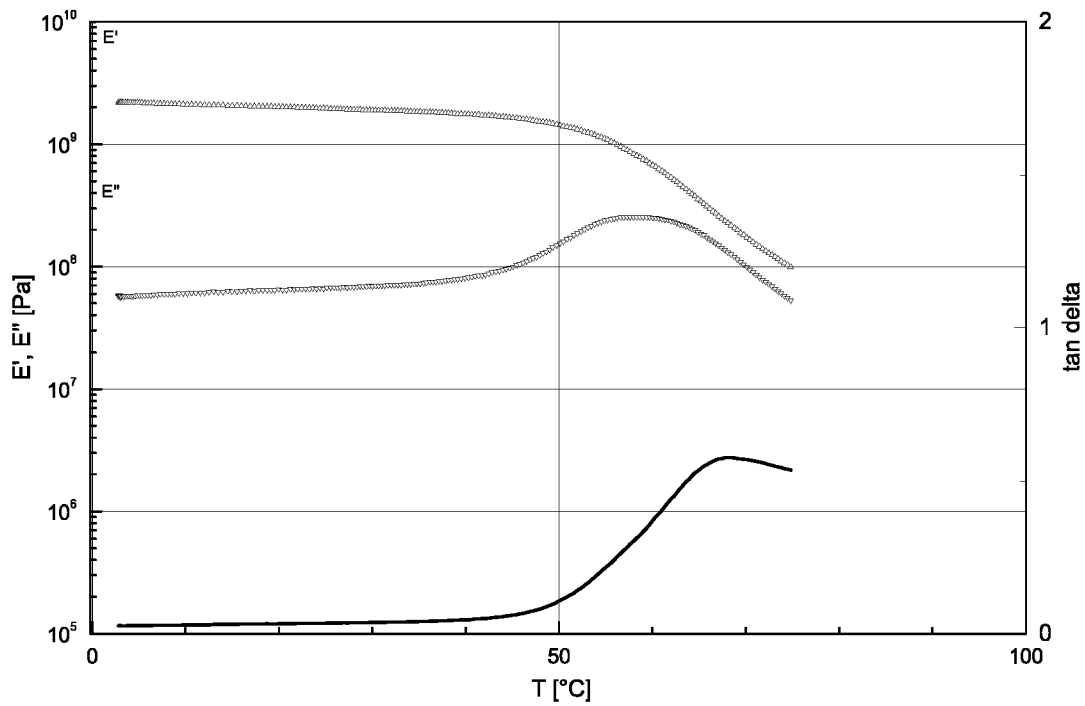
FIG. 3 shows DMA curves from experiment No. 1c (comparative example)

All of the samples were clear and had high transparency. FIG. 1 shows DMA curves of a sample from the inventive experiment No. 1. FIG. 2 shows DMA curves from experiment No. 1b (comparative example). FIG. 3 shows DMA curves from experiment No. 1c (comparative example).

TABLE 2

Formulas of UV-curable resin mixtures with urethane acrylate 2 (containing uretdione). The quantities are reported in parts by weight.

| Experiment No. | 9a | 9b | 9c | 9e | 9f* | 9* | 10 | 11 | 12 | 13 | 14 | 15 | 16* |
|---|---|---|---|---|---|---|---|---|---|---|---|---|---|
| Urethane acrylate 2 (including IBOMA) | 21 | 22 | 21 | 20 | 20 | 21 | 20 | 21 | 20 | 20 | 20 | 20 | 20 |
| IBOA | 80 | 75 | 70 | 63 | 60 | 55 | 50 | 45 | 40 | 35 | 30 | 25 | 65 |
| n-butyl acrylate | 0 | 5 | 10 | 17 | 20 | 25 | 30 | 35 | 40 | 45 | 50 | 55 | 15 |
| butanediol | 0 | 0 | 0 | 0 | 0 | 0 | 0 | 0 | 0 | 0 | 0 | 0 | 5 |
| photoinitiator | 0 | 5 | 5 | 5 | 5 | 5 | 5 | 5 | 5 | 5 | 5 | 5 | 5 |
| tactility at 40° C. | hard, brittle | hard, brittle | hard, slightly brittle | hard, tough | hard, tough | hard, tough | tough | soft | soft | tacky to touch | tacky to touch | tacky to touch | hard, tough, tacky |
| $T_g$ (tan δ)/DMA [° C.] | | | 71 | | | 38 | | | | | | | |
| E' 35° C./DMA [MPa] | | | 2041 | | | 534 | | | | | | | |
| tan δ 35° C./DMA | | | 0.05 | | | 0.136 | | | | | | | |

Figure 4:
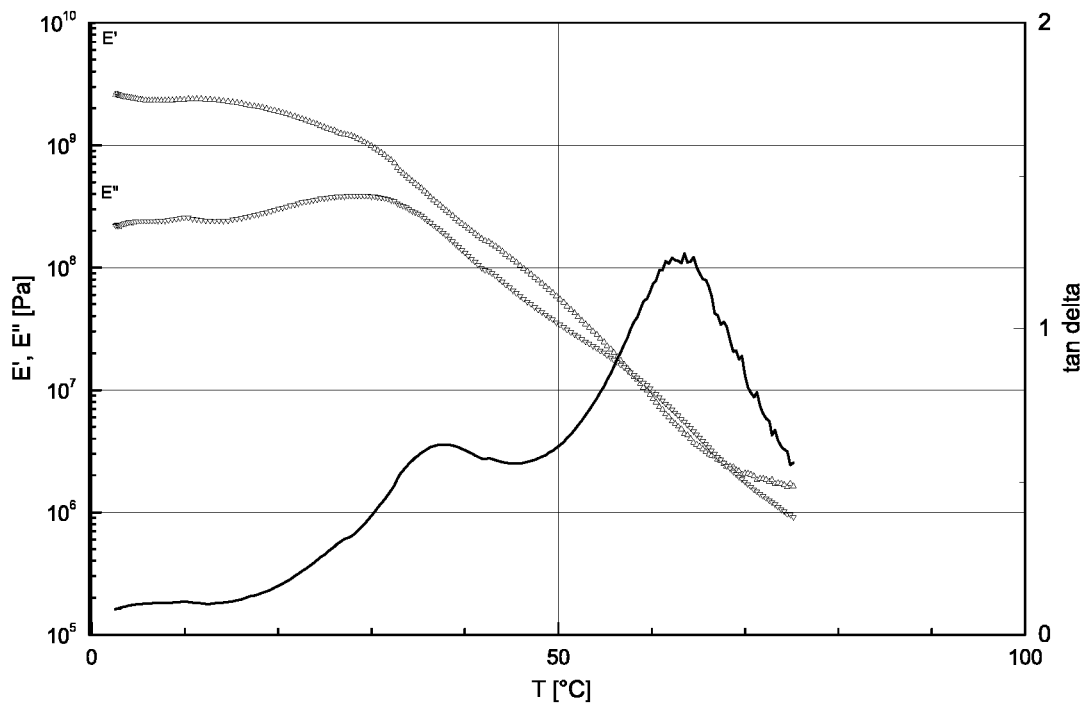
FIG. 4 shows DMA curves from the inventive experiment No. 9.
Figure 5:
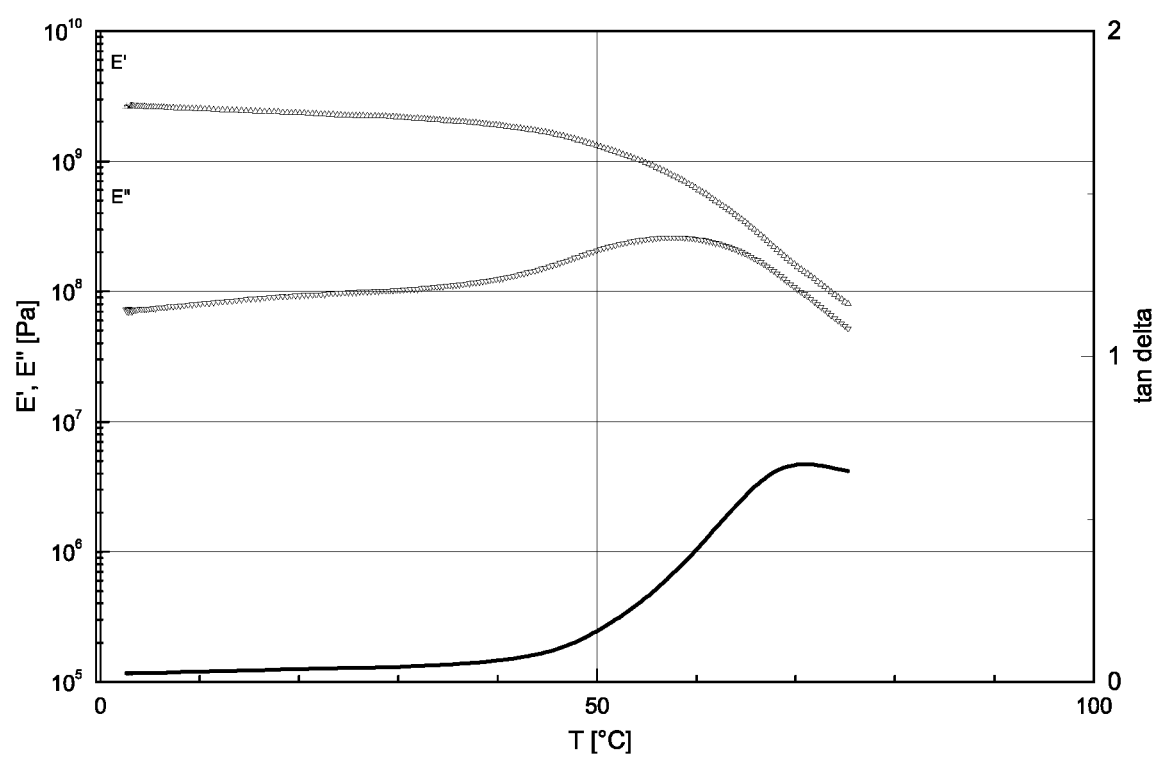
FIG. 5 shows DMA curves from experiment No. 9c (comparative example).

All of the samples were clear and had high transparency. FIG. 4 shows DMA curves from the inventive experiment No. 9. FIG. 5 shows DMA curves from experiment No. 9c (comparative example).

The invention claimed is:

1. A method for producing an orthodontic aligner, comprising:
   i) selecting a crosslinkable resin; and
   ii) shaping the aligner by crosslinking the crosslinkable resin to form a crosslinked polymer,
   wherein selecting the crosslinkable resin includes a criterion that a crosslinked polymer obtained after crosslinking of the crosslinkable resin has a glass transition temperature Tg, determined by dynamic mechanical analysis at a frequency of 1/s DMA as peak tan δ, of 25° C. and ≤60° C., an elasticity modulus, determined by dynamic mechanical analysis as storage modulus E' at a frequency of 1/s at 35° C., of ≥500 MPa and ≤4000 MPa, and a loss factor tan δ, determined by dynamic mechanical analysis at a frequency of 1/s at 35° C., of ≥0.08,
   wherein the crosslinkable resin comprises a first monomer and a second monomer, said first monomer being a (meth)acrylic monomer whose homopolymer has a glass transition temperature, determined by dynamic mechanical analysis at a frequency of 1/s as peak tan δ, of ≤0° C., and said second monomer being a (meth)acrylic or styrenic monomer whose homopolymer has a glass transition temperature, determined by dynamic mechanical analysis at a frequency of 1/s as peak tan δ, of ≥60° C., and where the first monomer is present in a fraction of ≥5 to ≤40 weight %, based on a total weight of the resin, and the second monomer is present in a fraction of ≥20 to ≤80 weight %, based on the total weight of the resin.

2. The method as claimed in claim 1, wherein the aligner is shaped by crosslinking the crosslinkable resin in a casting mold corresponding to the aligner.

3. The method as claimed in claim 1, wherein the aligner is shaped via an additive manufacturing method.

4. The method as claimed in claim 1, wherein the crosslinkable resin has free isocyanate groups, measured by 13C NMR, in a concentration ≥1 wt %, based on a total weight of the crosslinkable resin.

5. The method as claimed in claim 1, wherein the crosslinkable resin has free alcohol groups, measured by 13C NMR, in a concentration ≥0.5 wt %, based on a total weight of the crosslinkable resin.

6. An orthodontic aligner, comprising
   a crosslinked polymer having a glass transition temperature Tg, determined by dynamic mechanical analysis at a frequency of 1/s as peak tan δ, of ≥25° C. and ≤60° C., an elasticity modulus, determined by dynamic mechanical analysis as storage modulus E' at a frequency of 1/s at 35° C., of ≥500 MPa and ≤4000 MPa, and a loss factor tan δ, determined by dynamic mechanical analysis at a frequency of 1/s at 35° C., of 0.08,
   wherein the crosslinked polymer is a copolymer which comprises units based on a first monomer and a second monomer, said first monomer being a (meth)acrylic monomer whose homopolymer has a glass transition temperature, determined by dynamic mechanical analysis at a frequency of 1/s as peak tan δ, of ≤0° C., and said second monomer being a (meth)acrylic or styrenic monomer whose homopolymer has a glass transition temperature, determined by dynamic mechanical analysis at a frequency of 1/s as peak tan δ, of ≥60° C., and where units based on the first monomer are present in a fraction of ≥5 to ≤40 weight %, based on a total weight of the crosslinked polymer, and units based on the second monomer are present in a fraction of ≥20 to ≤80 weight %, based on the total weight of the crosslinked polymer, wherein the crosslinked polymer is obtained from a resin comprising:
   15-20 weight % of a urethane (meth)acrylate containing isocyanurate groups,
   1-5 weight % of alkanediol di(meth)acrylate,
   20-30 weight % of monofunctional (meth)acrylate whose resultant homopolymer has a glass transition temperature of ≤0° C.;
   50-60 weight % of monofunctional (meth)acrylate whose resultant homopolymer has a glass transition temperature of ≥60° C., each on the basis of the total weight of the resin.

7. The orthodontic aligner as claimed in claim 6, wherein the crosslinked polymer has an isocyanurate fraction, ascertained via 13C NMR, of ≥3%.

8. The orthodontic aligner as claimed in claim 6, wherein the crosslinked polymer has a refractive index, measured with an Abbe refractometer, of ≥1.48 RI and ≤1.58 RI.

9. The orthodontic aligner as claimed in claim 6, wherein the crosslinked polymer has a mean network arc length according to Flory and Huggins of ≥300 g/mol and ≤5000 g/mol.

10. The orthodontic aligner as claimed in claim 6, wherein the crosslinked polymer is a transparent polymer having a light transmittance, measured in a UV-VIS spectrometer on a sample with a thickness of 1 mm in a wavelength range of 400-800 nm, of ≥50%.

11. The orthodontic aligner as claimed in claim 6, wherein the crosslinked polymer is a transparent polymer comprising polyurethanes and/or polysilicones and has an Abbe number of ≥20.

12. An orthodontic aligner, comprising
a crosslinked polymer having a glass transition temperature Tg, determined by dynamic mechanical analysis at a frequency of 1/s as peak tan δ, of ≥25° C. and ≤60° C., an elasticity modulus, determined by dynamic mechanical analysis as storage modulus E' at a frequency of 1/s at 35° C., of ≥500 MPa and ≤4000 MPa, and a loss factor tan δ, determined by dynamic mechanical analysis at a frequency of 1/s at 35° C., of 0.08,
wherein the crosslinked polymer is a copolymer which comprises units based on a first monomer and a second monomer, said first monomer being a (meth)acrylic monomer whose homopolymer has a glass transition temperature, determined by dynamic mechanical analysis at a frequency of 1/s as peak tan δ, of ≤0° C., and said second monomer being a (meth)acrylic or styrenic monomer whose homopolymer has a glass transition temperature, determined by dynamic mechanical analysis at a frequency of 1/s as peak tan δ, of ≥60° C., and where units based on the first monomer are present in a fraction of ≥5 to ≤40 weight %, based on a total weight of the crosslinked polymer, and units based on the second monomer are present in a fraction of ≥20 to ≤80 weight %, based on the total weight of the crosslinked polymer, wherein the crosslinked polymer is obtained from a resin comprising:
10-15 weight % of a urethane (meth)acrylate containing isocyanurate groups,
5-10 weight % of monofunctional methacrylate of a terpene alcohol,
20-35 weight % of monofunctional (meth)acrylate whose resultant homopolymer has a glass transition temperature of ≤0° C.;
55-60 weight % of monofunctional (meth)acrylate whose resultant homopolymer has a glass transition temperature of ≥60° C., each on the basis of the total weight of the resin.

13. The orthodontic aligner as claimed in claim 12, wherein the crosslinked polymer has an isocyanurate fraction, ascertained via 13C NMR, of ≥3%.

14. The orthodontic aligner as claimed in claim 12, wherein the crosslinked polymer has a refractive index, measured with an Abbe refractometer, of ≥1.48 RI and ≤1.58 RI.

15. The orthodontic aligner as claimed in claim 12, wherein the crosslinked polymer has a mean network arc length according to Flory and Huggins of ≥300 g/mol and ≤5000 g/mol.

16. The orthodontic aligner as claimed in claim 12, wherein the crosslinked polymer is a transparent polymer having a light transmittance, measured in a UV-VIS spectrometer on a sample with a thickness of 1 mm in a wavelength range of 400-800 nm, of ≥50%.

17. The orthodontic aligner as claimed in claim 12, wherein the crosslinked polymer is a transparent polymer comprising polyurethanes and/or polysilicones and has an Abbe number of ≥20.

* * * * *